(12) United States Patent
Nishio et al.

(10) Patent No.: US 7,472,888 B2
(45) Date of Patent: *Jan. 6, 2009

(54) VALVE HOLDING MEMBER

(75) Inventors: Takuya Nishio, Tokyo (JP); Jin Yamashita, Tokyo (JP); Hideyuki Sanada, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/801,173

(22) Filed: May 8, 2007

(65) Prior Publication Data

US 2007/0262281 A1 Nov. 15, 2007

Related U.S. Application Data

(63) Continuation of application No. PCT/JP2005/020322, filed on Nov. 4, 2005.

(30) Foreign Application Priority Data

Nov. 9, 2004 (JP) ............................... 2004-324974

(51) Int. Cl.
*F16K 51/00* (2006.01)
*F16L 29/00* (2006.01)
*F16L 37/28* (2006.01)
(52) U.S. Cl. .................. 251/337; 251/149.9; 251/149.6
(58) Field of Classification Search .............. 251/149.1, 251/149.3, 149.6, 149.9, 337
See application file for complete search history.

(56) References Cited

U.S. PATENT DOCUMENTS

| 2,594,641 | A | * | 4/1952 | Griffith et al. ............... 137/543 |
| 2,666,656 | A | * | 1/1954 | Bruning ................... 137/899.2 |
| 2,823,048 | A | * | 2/1958 | Hansen ..................... 251/149.6 |
| 4,846,506 | A | | 7/1989 | Bocson et al. |
| 6,095,190 | A | * | 8/2000 | Wilcox et al. .......... 137/614.04 |
| 2004/0211474 | A1 | | 10/2004 | Mikiya et al. |

FOREIGN PATENT DOCUMENTS

| DE | OS 1775821 | 8/1971 |
| JP | S55-33091 Y | 8/1980 |
| JP | S50-117421 | 7/2008 |

OTHER PUBLICATIONS

Office Action received from German Patent and Trademark Office dated Aug. 23, 2007 in corresponding German Patent Application No. 11 2005 002 758.9-24 (translation included).
Korean Office Action dated Jul. 15, 2008 for Korean Application No. 2007-7010546 and translation.

* cited by examiner

*Primary Examiner*—John K Fristoe, Jr.
(74) *Attorney, Agent, or Firm*—Brinks Hofer Gilson & Lione

(57) ABSTRACT

There is provided a valve holding member for holding a valve of a pipe coupling. The valve holding member includes a hub part 33 having a guide hole 34 for a valve stem, two arm parts 32 diametrically opposing each other on the peripheral edge of the hub part, and spring holding parts 31 formed at the peripheral edge.

7 Claims, 7 Drawing Sheets

VALVE HOLDING MEMBER

This application is a continuation of PCT/JP2005/020322, filed Nov. 4, 2005, which claims priority to Japanese Application No. JP2004-324974 filed Nov. 9, 2004. The entire contents of these applications are incorporated herein by reference.

BACKGROUND OF THE INVENTION

1. Field of the Invention

The present invention relates to a valve holding member for holding a valve for opening and closing a fluid passage of a pipe coupling and, more particularly, to a valve holding member made of a single sheet metal.

2. Description of the Related Arts:

In a pipe coupling which employs a poppet valve for opening and closing a fluid passage, a valve holding member is used which has a hub part through which a valve stem extends, and a plurality of arm parts extending radially outwardly from the peripheral edge of the hub part and securely engaging with the inner surface of the fluid passage to retain the hub part in the center of the fluid passage. The valve is set such that a valve head thereof is urged against a valve seat formed on the inner surface of the fluid passage by means of a coil spring disposed around the valve stem and between the hub part and the valve head.

The present applicant has filed an application related to a valve holding member characterized in that the valve holding member is made of a single sheet metal (Japanese Examined Utility Model Publication No. Sho 55-33091). This valve holding member has the advantage of being fabricated at low cost.

However, this sheet metal valve holding member needs three arm parts to stably hold a valve, and therefore there is a problem that a resistance to a fluid flowing in a fluid passage is large.

In view of the foregoing, it is an object of the present invention to provide a sheet metal valve holding member in which a flow resistance of the fluid passage can be reduced as much as possible and which can stably hold a valve.

SUMMARY OF THE INVENTION

The present invention provides a valve holding member made of a single sheet metal for movably holding, along a fluid passage of a pipe coupling, a valve for opening and closing the fluid passage. The valve holding member includes a hub part having a guide hole through which a valve stem of the valve extends, and two arm parts diametrically opposing each other on the peripheral edge of the hub part and extending from the peripheral edge in the axial and radially outward direction with respect to the axis of the valve stem to securely engage with the peripheral wall of the fluid passage at distal end portions thereof.

Specifically, the distal end portion of each of the arm parts may be wider than the other portion thereof extending from the hub part.

The hub part may have a circular portion abutting against one end of a coil spring disposed around the valve stem and biasing the valve toward a fluid passage closing position, and arm connecting portions diametrically opposing each other on the peripheral edge of the circular portion, each extending outwardly from the peripheral edge and having a distal end from which the corresponding arm part extend.

Further, the hub part may also have a plurality of spring holding parts diametrically opposing each other on the peripheral edge of the circular portion thereof and extending in the axial direction opposite to the direction in which the arm parts extend, the spring holding parts being positioned adjacent to the outer peripheral surface of one end of the coil spring abutting against the circular portion.

Furthermore, the valve holding member may have any one of a first reinforcing protrusion protruding in the radial direction along the longitudinal direction of each of the arm parts, a tubular reinforcing part formed around the guide hole and extending from the hub part in the axial direction, and a second reinforcing protrusion formed on the hub part and protruding in the axial direction.

The first reinforcing protrusion and the second reinforcing protrusion may be formed continuously.

The arm parts each have a distal end edge engageable with an annular holding shoulder portion formed on the inner wall of the fluid passage of the pipe coupling, and the distal end edges may each be provided at the central portion thereof with a non-engagement portion unengageable with the holding shoulder portion.

Preferably, the interior angle between the hub part and each of the arm parts is approximately 90 degrees when the sheet metal valve holding member is mounted in the pipe coupling.

Basically, in the valve holding member according to the present invention, the flow resistance of the fluid passage can be reduced compared with a conventional valve holding member by reducing the number of arm parts to two. Moreover, the distal end portion of each of the arm parts is widened, whereby the valve holding member can be stably held in the pipe coupling. Further, the hub part is composed of a circular portion and arm connecting portions, and thus the area of the hub part can be reduced relative to the cross section of the fluid passage, which can also reduce the flow resistance of the fluid passage. Furthermore, in a state in which the valve holding member is mounted in the pipe coupling, the interior angle between the hub part and each of the arm parts is approximately right, whereby it is possible to adequately maintain pressure resistance of the arm parts against a fluid force even if the valve holding member has only two arm parts. The valve holding member is provided with reinforcing structures, whereby it is possible to increase pressure resistance against a fluid even though the valve holding member is formed from a single sheet metal. The arm parts are each provided at the distal end edges thereof with a non-engagement portion, thereby being able to surely engage with the holding shoulder portion on the inner wall of the pipe coupling even if the arm parts are deformed.

BRIEF DESCRIPTION OF THE DRAWINGS

FIG. 1b is a right sight view of FIG. 1a.

FIG. 2a is a front view of the sheet metal valve holding member used in the pipe coupling in FIG. 1a.

DESCRIPTION OF THE PREFERRED EMBODIMENTS

A preferred embodiment of the present invention will now be described in detail with reference to the accompanying drawings.

Figure 1A:
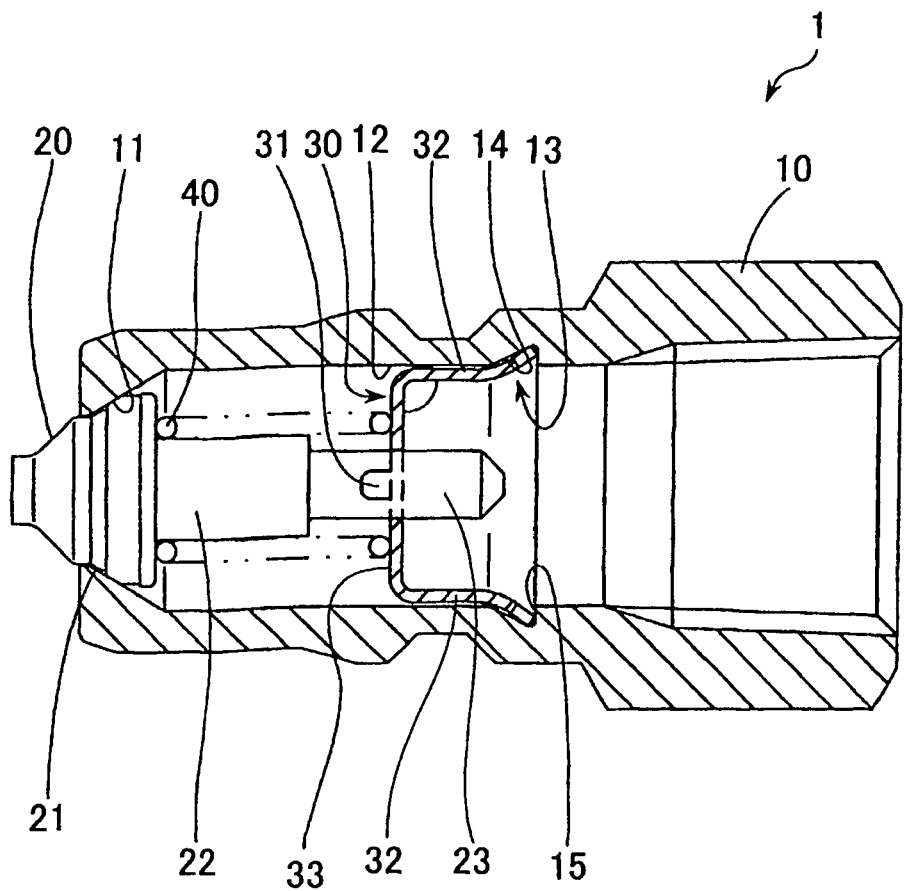
FIG. 1a is a sectional side view of a plug-side coupling of a pipe coupling equipped with a sheet metal valve holding member according to a first embodiment of the present invention.
Figure 1B:
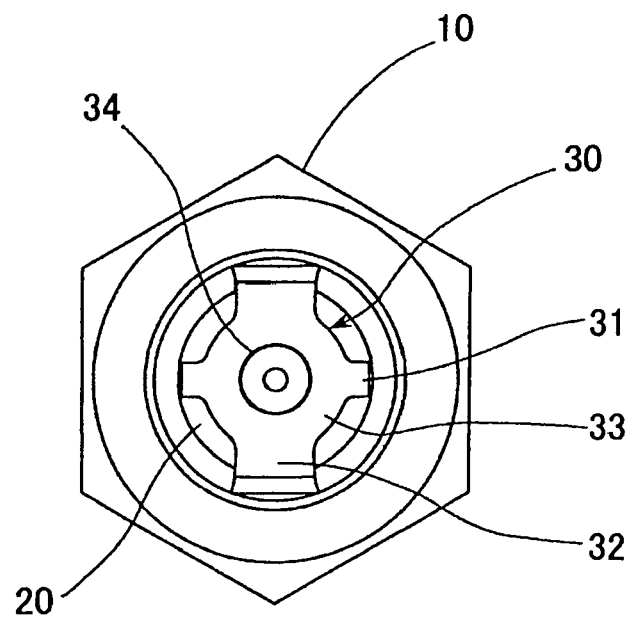

FIG. 1a is a sectional view of a male coupling 1 equipped with a sheet metal valve holding member according to one embodiment of the present invention. FIG. 1b is a right side view of FIG. 1a.

In use of the male coupling 1, a pipe (not shown) is connected to the right side of a coupling body 10 as seen in FIG. 1a, while a female coupling (not shown) is connected to the left side of the coupling body 10. The annular coupling body 10 is provided with a poppet valve 20, a coil spring 40 for biasing the poppet valve 20, and a valve holding member 30 for holding the coil spring 40 and the poppet valve 20. The valve holding member 30, as will be described later, has a hub part 33 having a guide hole 34 for slidably receiving a valve stem of the poppet valve and arm parts 32 extending from the peripheral edge of the hub part.

In assembly of the male coupling 1, the poppet valve 20 and the coil spring 40 are inserted into the coupling body 10, and then the valve holding member 30 is pushed leftward into the coupling body 10 while contracting the coil spring 40. When the valve holding member 30 is advanced leftward in the coupling body, the arm parts 32 are engaged with and bent by the inner peripheral surface of the coupling body 10. When the distal ends of the arm parts 32 reach an arm holding groove 13 formed on the inner peripheral surface of the coupling body 10, the distal ends engage with an arm holding shoulder portion 15, whereby the valve holding member is securely held in the coupling body. The poppet valve 20 is biased by the coil spring 40 to abut against a valve seat 11 of the coupling body 10, thereby closing a fluid port 21 through which a fluid passes.

A valve stem large-diameter portion 22 of the poppet valve 20 slidably engages the inner periphery of the coil spring 40, while a valve stem small-diameter portion 23 is slidably inserted into the guide hole 34 of the hub part 33 of the valve holding member 30. The hub part 33 is provided at the peripheral edge thereof with spring holding parts 31 for engaging with the outer peripheral surface of one end of the coil spring 40. The poppet valve 20 is held by the valve holding member and the coil spring such that its axis extends in the fluid passage direction, which enables precise opening and closing movements of the valve.

A female coupling also has a structure similar to the above-described valve structure. When the male coupling is inserted into and connected to the female coupling, the poppet valves of the male coupling and the female coupling abut each other at their distal ends and move relative to the tubular bodies of the male coupling and the female coupling, thereby opening the fluid passage of the tubular bodies.

Next, first to fourth embodiments of the valve holding member 30 will be described in detail.

Figure 2A:
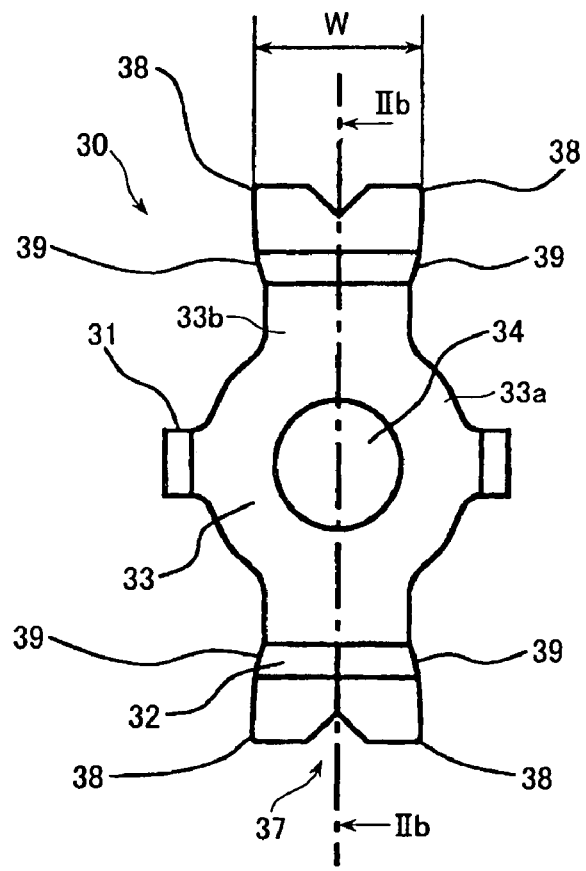
Figure 2B:
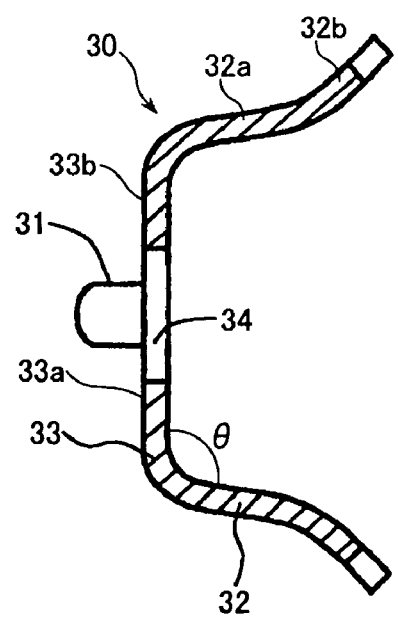
FIG. 2b is a sectional view of the sheet metal valve holding member taken along line IIb-IIb.

FIG. 2a is a front view of the valve holding member 30 according to the first embodiment of the present invention. FIG. 2b is a sectional view taken along line II-IIb of FIG. 2a.

The valve holding member 30 includes a hub part 33 and two arm parts 32. The hub part 33 has a circular portion 33a having at the center thereof a guide hole 34 through which a valve stem 23 extends (FIG. 1) and engaging with one end of a coil spring 40 (FIG. 1), arm connecting portions 33b diametrically opposing each other at the peripheral edge of the circular portion 33a, each extending outwardly to the corresponding arm part 32, and two spring holding parts 31 extending in the axial direction opposite to the axial direction in which the arm parts 32 extend from the hub part so as to contact with the outer peripheral surface of one end of the coil spring 40 engaged by the circular portion 33a. In the example shown in the figure, the spring holding parts 31 are each disposed intermediately between the two arm connecting portions 33b.

The arm parts 32 extend in the axial direction of the valve stem (rightward direction as seen in FIG. 2b) and slightly radially outward direction with respect to the axis of the valve stem. As shown in the figure, each of the arm parts 32 is composed of a first arm portion 32a extending from the corresponding arm connecting portion 33b of the hub part 33, and a second arm portion 32b extending from the first arm portion 32a to the distal end of the arm part. The first arm portion 32a extends at an interior angle ι of approximately 100 to 110 degrees with respect to the arm connecting portion 33b, and the second arm portion 32b extends at a still greater interior angle. Further, the first arm portion 32a extends such that its width gradually increases with it being farther away from the arm connecting portion 33b approaching the second arm portion 32b, and then the second arm portion 32b also extends such that its width gradually increases until it reaches the maximum width W at the distal end thereof. The distal end is provided with a notch 37, at the central portion in the widthwise direction thereof.

Figure 6A:
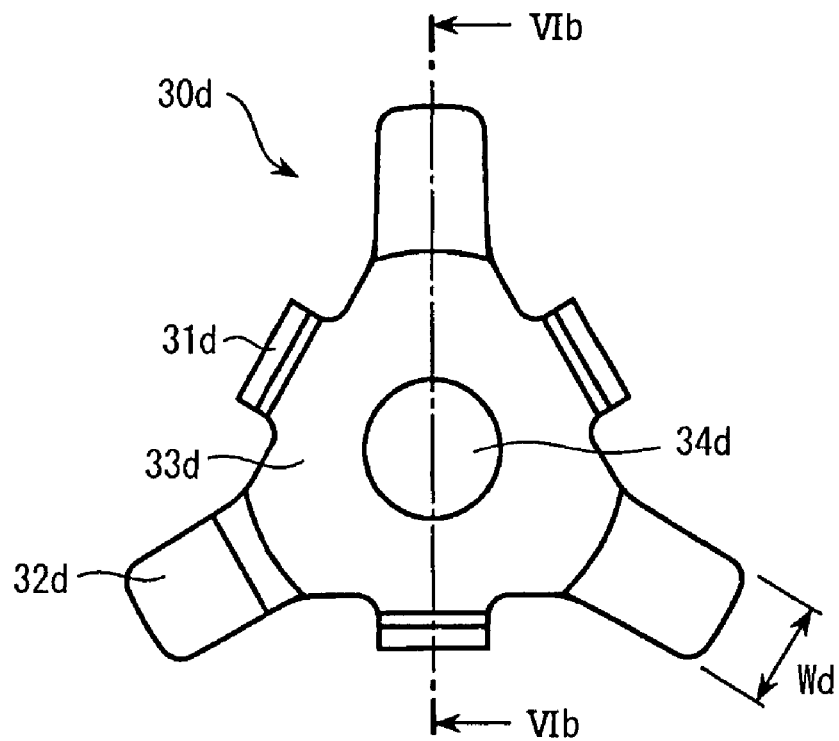
FIG. 6a is a front view of a conventional sheet metal valve holding member.
Figure 6B:
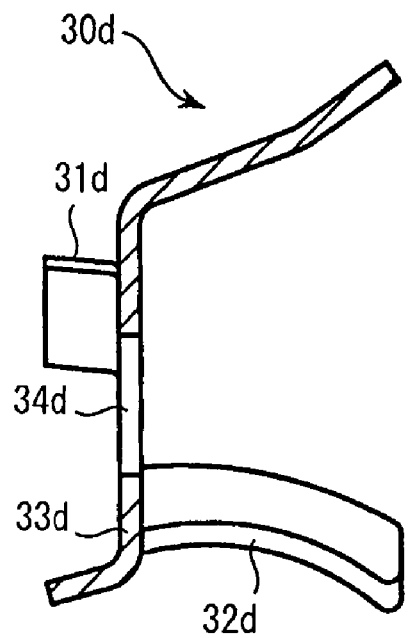
FIG. 6b is a sectional view of the sheet metal valve holding member taken along line VIb-VIb.

FIG. 6a shows a front view of a conventional sheet metal valve holding member, and FIG. 6b shows a sectional view taken along line VIb-VIb of FIG. 6a, for the comparison with the valve holding member according to the present invention. The sheet metal valve holding member 30d has a hub part 33d having at the center thereof a guide hole 34d, three arm parts 32d, and spring holding parts 31d.

As shown in the figure, the hub part 33d is generally triangle-shaped, and the arm parts 32d extend from the vertex portions of the triangle shape. Each of the arm parts 32b is formed such that its width gradually decreases with it being farther away from the connecting portion thereof to the hub part 33d until it reaches the minimum width Wd at the distal end thereof.

When comparing the sheet metal valve holding member 30 according to the first embodiment of the present invention with the conventional sheet metal valve holding member 30d, the number of the arm parts 32 is reduced from three to two, and the area of the hub part 33 is also reduced. Contrary to the prior art, in the first embodiment, each of the arm parts 32 is formed such that its width gradually increases with it being farther away from the corresponding connecting portion connecting of the hub part 33. The reason for the enlargement of the width of the arm parts 32 is mainly to maintain the strength of the arm parts despite the decrease in the number of the arm parts from three to two. In addition, the width of the distal end of each of the arm parts engaging with the inner peripheral surface of the pipe coupling is enlarged, which contributes to stably mount the sheet metal valve holding member 30 on the inner peripheral surface of the pipe coupling.

Figure 7A:
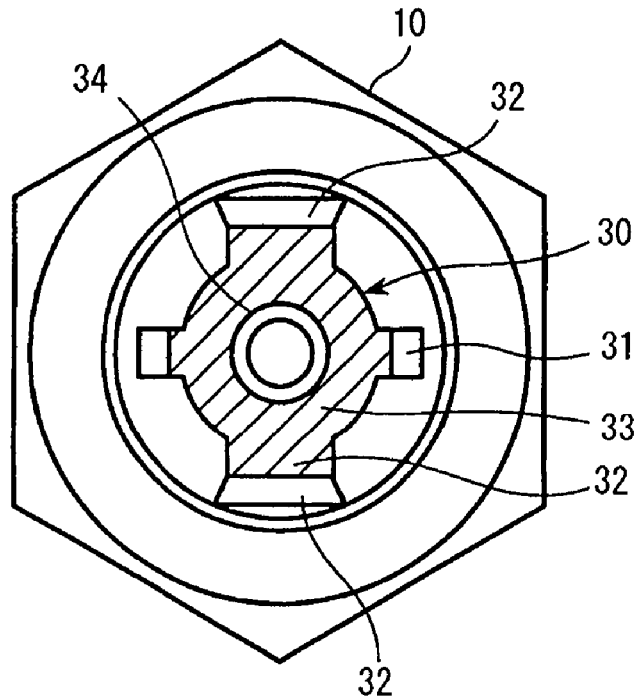
FIG.-7a is a front view of the sheet metal valve holding member according to the first embodiment, for comparing the front view of the sheet metal valve holding member according to the first embodiment and that of the conventional sheet metal valve holding member.
Figure 7B:
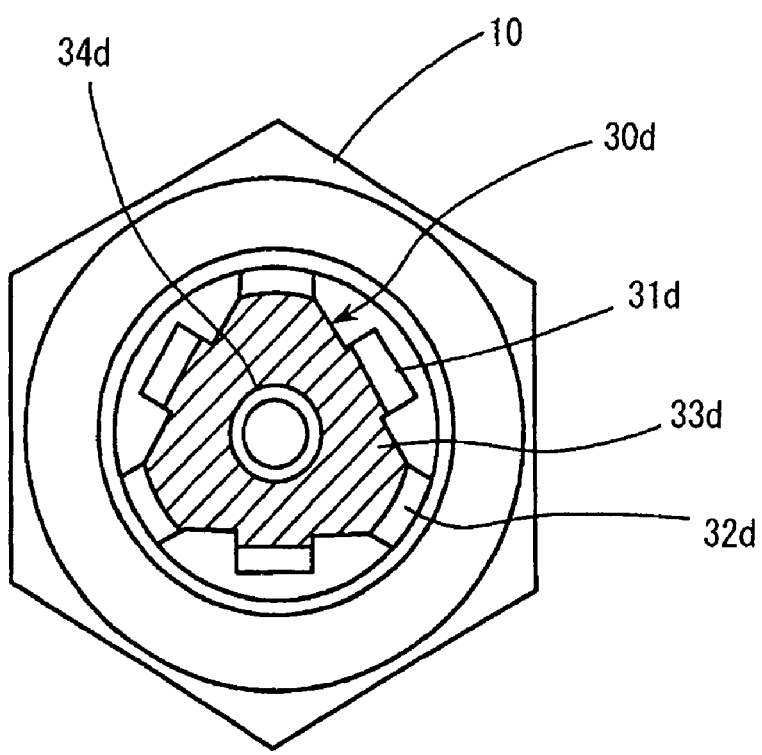
FIG.-7b is a front view of the conventional sheet metal valve holding member, for comparing the front view of the sheet metal valve holding member according to the first embodiment and that of the conventional sheet metal valve holding member.

A comparison is made between the sheet metal valve holding member 30 (FIG. 7a) according to the first embodiment and the conventional sheet metal valve holding member 30d (FIG. 7b), in an assembled state in the plug body 10. In the sheet metal valve holding member 30 according to the first embodiment, the cross-hatched area, i.e., the hub part area which has a large influence on the flow resistance of the fluid passage, is reduced by approximately 20% compared with the conventional sheet metal valve holding member 30d. Most of the distal end portion of the arm part 32 is housed in the arm holding groove 13 (see FIG. 1), whereby it is possible to minimize the influence of the enlargement of the width W of the arm part 32 on the flow resistance of the fluid passage. The reduction of the above-described cross-hatched area can be achieved by the hub part 33 composed of the small-diameter circular portion 33a and the arm connecting portions 33b. Further, in the valve holding member 30 according to the present invention, the interior angle (as shown in FIG. 2b) is adapted to be approximately 90 to 100 degrees when the valve holding member 30 is mounted in the pipe coupling as shown in FIG. 1b. This interior angle is smaller than an interior angle of approximately 115 degrees in the conventional valve holding member. Therefore, in this regard, the flow resistance of the fluid passage can be reduced.

Referring back to FIGS. 2a and 2b, the above-described sheet metal valve holding member 30 is provided with a V-shaped notch 37 serving as a clearance (or a non-engagement portion), at the distal end of each of the arm parts thereof. The reason for this arrangement is to stably mount the sheet metal valve holding member 30 in the arm holding groove 13 by enabling the distal end of each of the arm parts to engage with the arm holding shoulder portion 15 of the arm holding groove 13 at a plurality of points or lines even if the distal end is warped or distorted in a fabrication process. Both corners 38 of the distal end of each of the arm parts 32 firmly engage with an inclined inner peripheral surface 14 of the inner peripheral surface 12 of the plug body 10, whereby the sheet metal valve holding member 30 is stably secured. Further, the side edges 39 of each of the arm parts 32 abut against the peripheral surface 12 of the fluid passage, whereby the sheet metal valve holding member 30 is prevented from inclining. This configuration may be applied to other embodiments as well as to the above-described first embodiment.

Figure 3A:
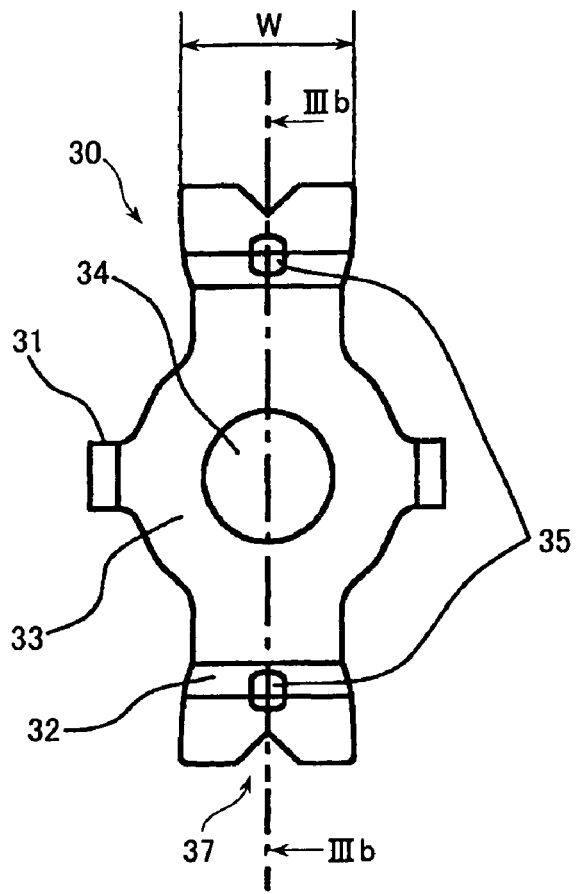
FIG. 3a is a front view of a sheet metal valve holding member according to a second embodiment of the present invention.
Figure 3B:
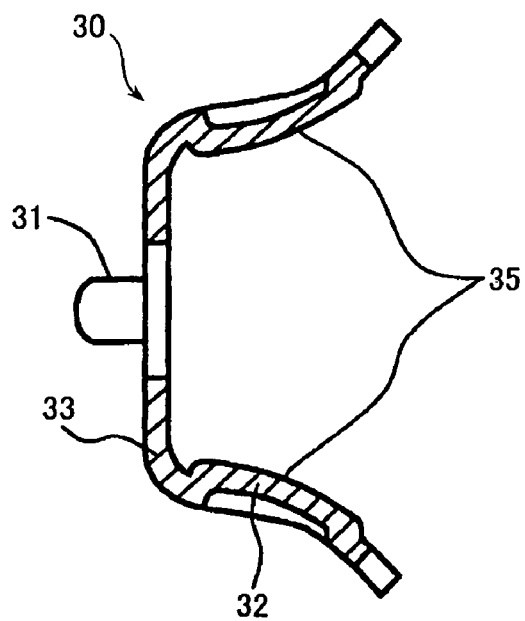
FIG. 3b is a sectional view of the sheet metal valve holding member taken along line IIIb-IIIb.

FIG. 3a shows a front view of a sheet metal valve holding member 30 according to the second embodiment of the present invention. FIG. 3b shows a sectional view taken along line IIIb-IIIb of FIG. 3a. The sheet metal valve holding member 30 is characterized in that the arm parts 32 are each provided with a reinforcing protrusion 35 extending in the longitudinal direction thereof. The other configuration is substantially the same as that of the first embodiment. The reinforcing protrusions 35 are adapted to extend substantially along the fluid passage direction when the valve holding member is set in a pipe coupling. Thus, an increase in the flow resistance of the fluid passage is substantially restrained. Further, the reinforcing protrusions 35 can be formed by pressing, as is the case with the arm parts 32 and the spring holding parts 31. Therefore, it is possible to improve the arm part strength with little increase in cost.

Figure 4A:
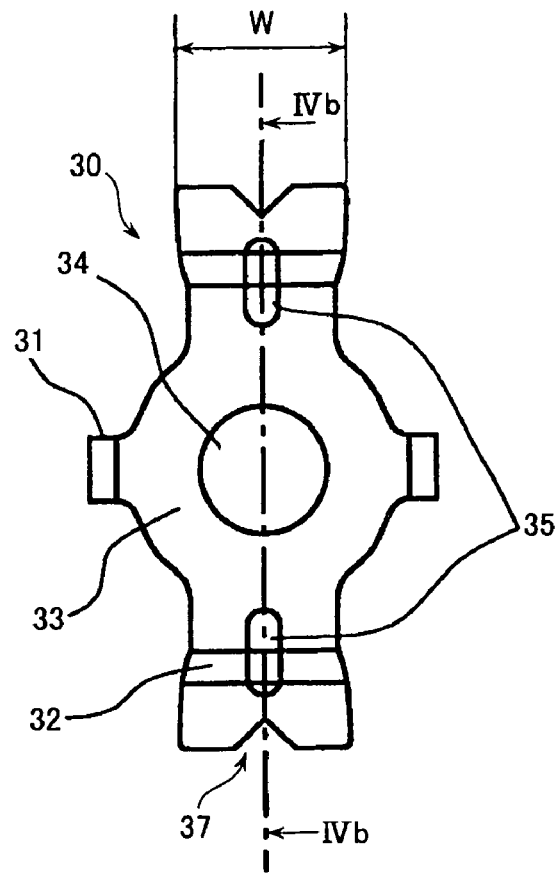
FIG. 4a is a front view of a sheet metal valve holding member according to a third embodiment of the present invention.
Figure 4B:
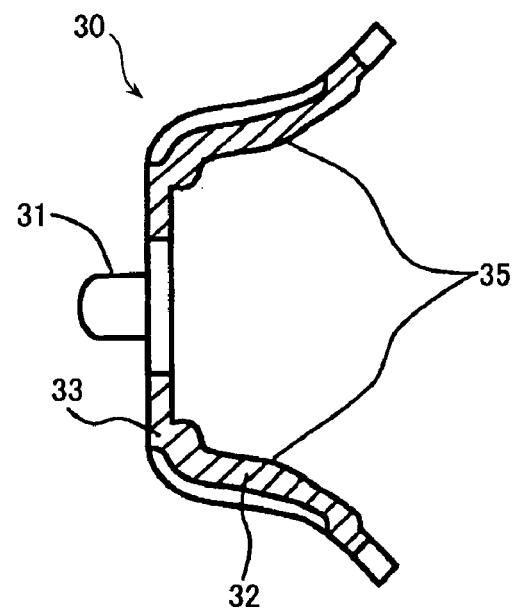
FIG. 4b is a sectional view of the sheet metal valve holding member taken along line IVb-IVb.

FIG. 4a shows a front view of a sheet metal valve holding member according to the third embodiment of the present invention. FIG. 4b shows a sectional view taken along line IVb-IVb of FIG. 4a. In this embodiment, the sheet metal valve holding member 30 is characterized in that it is provided with reinforcing protrusions 35 each extending from the corresponding arm connecting portion 33b of the hub part 33 to the corresponding arm part 32 in the longitudinal direction of the arm part. The other configuration is substantially the same as that of the first embodiment. With the reinforcing protrusions 35, the whole strength of the sheet metal vale holding member can be increased.

Figure 5A:
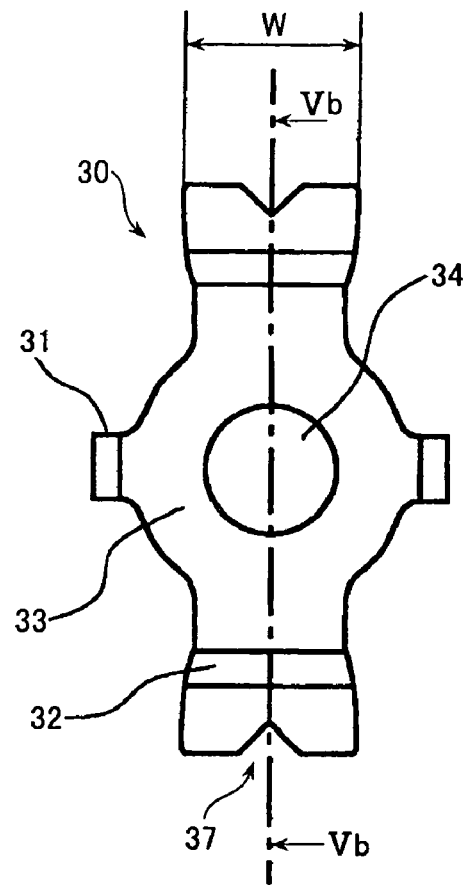
FIG. 5a is a front view of a sheet metal valve holding member according to a fourth embodiment of the present invention.
Figure 5B:
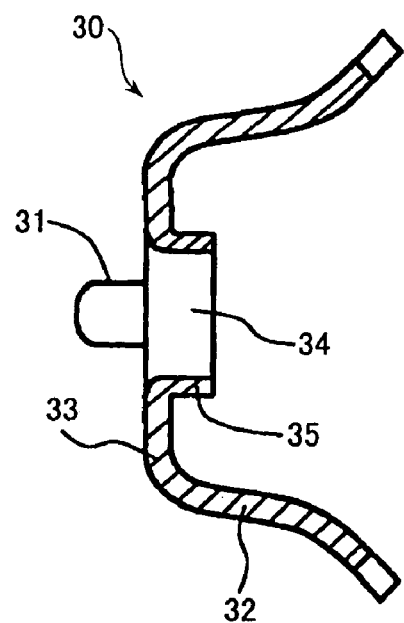
FIG. 5b is a sectional view of the sheet metal valve holding member taken along line Vb-Vb.

FIG. 5a shows a front view of a sheet metal valve holding member according to the fourth embodiment of the present invention. FIG. 5b shows a sectional view taken along line Vb-Vb of FIG. 5a. The sheet metal valve holding member 30 is characterized in that the hub part 33 of the sheet metal valve holding member 30 is provided with a tubular reinforcing part 35 extending from the peripheral edge of the guide hole 34 in the same direction as the arm parts 32. The other configuration is substantially the same as that of the first embodiment. With the tubular reinforcing part 35, the strength of the hub part 33 can be increased while the resilience of the arm parts 32 is maintained. Further, the tubular reinforcing part can serve as a valve guide to stably guide the valve. The tubular reinforcing part 35 may be formed so as to extend in the axial direction opposite to the axial direction in which the arm parts 32 extend.

According to the present invention as described above, the number of the arm parts is reduced from three in the conventional valve holding member to two, whereby the flow resistance of the fluid passage can be substantially reduced. Moreover, each of the arm parts is formed such that its width increases toward the distal end thereof, whereby the strength of the sheet metal valve holding member is maintained and the sheet metal valve holding member can be stably secured in the pipe coupling even if the sheet metal valve holding member has only two arm parts. Further, the interior angle between the hub part and each of the arm parts is adapted to be approximately 90 degrees when the sheet metal valve holding member is mounted in the pipe coupling, whereby the flow resistance of the fluid passage can be further reduced. Furthermore, the sheet metal valve holding member is provided on the arm parts and the hub part thereof with reinforcing structures, such as reinforcing protrusions and a tubular reinforcing part, whereby the strength of the valve holding member can be maintained even if the valve holding member has only two arm parts. These reinforcing structures can be formed without much increase in the flow resistance of the fluid passage. In addition, the reinforcing structures are formed by pressing, whereby it is possible to increase the strength of the valve holding member with little increase in cost. While the protrusions and the tubular reinforcing part are individually provided as a reinforcing structure in the above-described embodiments, these reinforcing structures may, of course, be used in combination.

What is claimed is:

1. A valve holding member for movably holding, along a fluid passage of a pipe coupling, a valve for opening and closing the fluid passage, the valve holding member being made of a sheet metal, the pipe coupling comprising an interior surface defining the fluid passage having an axis, the interior surface having an annular groove formed therein comprising an annular inclined surface and an annular shoulder facing in a direction of the axis, the valve holding member comprising:
   a hub part having a circular portion having an outer peripheral edge and an inner peripheral edge defining a guide hole through which a valve stem of the valve extends axially relative to the fluid passage, and a pair of arms connecting portions diametrically opposing each other and extending radially outwardly from the outer peripheral edge, the arm connecting portions each having a distal end close to the interior surface of the fluid passage when the valve holding member is installed in the fluid passage; and,
   two arm parts axially and radially outwardly extending from the distal ends of the arm connecting portions, respectively, and having distal end portions bent radially outwardly relative to remaining portions of the arm parts, the arm parts each being configured to be engaged with and bent by the interior surface of the fluid passage, when the valve holding member is installed in the fluid passage, so as to extend along the interior surface of the fluid passage with the distal end portions received in the annular groove, the arm parts each having a distal end edge engageable with the shoulder and the distal end edge having at a central portion thereof a non-engagement portion unengageable with the shoulder.

2. A valve holding member according to claim 1, wherein the circular portion is configured to abut against one end of a coil spring disposed around the valve stem and biasing the valve toward a fluid passage closing position.

3. A valve holding member according to claim 2, wherein the valve holding member has a plurality of spring holding parts diametrically opposing each other on the outer peripheral edge of the circular portion of the hub part and extending in the axial direction opposite to the axial direction in which the arm parts extend, the spring holding parts being positioned adjacent to the outer peripheral surface of one end of the coil spring abutting against the circular portion.

4. A valve holding member according to claim 3, wherein the valve holding member has any one of a first reinforcing protrusion protruding in the radially outward or radially inward direction along the longitudinal direction of each of the arm parts, a tubular reinforcing part formed around the guide hole and extending from the hub part in the axial direction, and a second reinforcing protrusion formed on the hub part and protruding in the axial direction.

5. A valve holding member according to claim 4, wherein the first reinforcing protrusion and the second reinforcing protrusion are continuously formed.

6. A valve holding member according to claim 1, wherein the interior angle between the hub part and each of the arm parts is approximately 90 degrees when the sheet metal valve holding member is mounted in the pipe coupling.

7. A valve holding member according to claim 1, wherein the distal end portion of each of the arm parts is wider than the remaining portion of the arm parts.

* * * * *